(12) United States Patent
Benz et al.

(10) Patent No.: US 7,609,981 B2
(45) Date of Patent: Oct. 27, 2009

(54) DELIBERATE SIGNAL DEGRADATION FOR OPTIMIZING RECEIVER CONTROL LOOPS

(75) Inventors: Andreas Benz, Erlangen (DE); Siegfried Gronbach, Bubenreuth (DE); Roland Seitz, Berg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 432 days.

(21) Appl. No.: 11/221,068

(22) Filed: Sep. 7, 2005

(65) Prior Publication Data

US 2007/0053688 A1    Mar. 8, 2007

(51) Int. Cl.
*H04B 10/08* (2006.01)
*H04B 7/00* (2006.01)

(52) U.S. Cl. ............... 398/209; 398/202; 398/206; 398/208; 398/158; 398/27; 455/69; 455/67.13; 455/63.1; 455/63.2; 455/63.3; 455/64; 455/65

(58) Field of Classification Search ............ 398/27, 398/9, 209, 202, 206, 208, 158; 455/69, 455/63.1–65, 67.13

See application file for complete search history.

(56) References Cited

U.S. PATENT DOCUMENTS

| | | | |
|---|---|---|---|
| 6,219,162 B1 * | 4/2001 | Barnard et al. ............ 398/9 |
| 6,430,398 B1 * | 8/2002 | Blanc .................. 455/67.13 |
| 6,433,904 B1 * | 8/2002 | Swanson et al. ........... 398/91 |
| 6,549,785 B1 * | 4/2003 | Agin ..................... 455/522 |
| 6,697,577 B1 * | 2/2004 | Li et al. ................. 398/202 |
| 6,807,429 B2 * | 10/2004 | Subrahmanya ............ 455/522 |
| 6,876,868 B2 * | 4/2005 | Crocker et al. ............ 455/522 |
| 6,885,828 B1 * | 4/2005 | Cornelius ................. 398/209 |
| 6,943,937 B2 * | 9/2005 | Lelic et al. ............. 359/337.11 |
| 6,944,401 B2 * | 9/2005 | Olier et al. .............. 398/94 |
| 6,950,632 B1 * | 9/2005 | Yun et al. ................ 455/69 |
| 7,020,483 B2 * | 3/2006 | Oestreich ................ 455/522 |
| 7,035,231 B2 * | 4/2006 | Yu et al. ................. 370/318 |
| 7,091,793 B2 * | 8/2006 | Bardsley et al. ........... 330/308 |
| 7,116,851 B2 * | 10/2006 | Welch et al. ............. 385/14 |
| 7,246,059 B2 * | 7/2007 | Behboodian et al. ....... 704/226 |
| 7,263,287 B2 * | 8/2007 | Xu ....................... 398/27 |
| 7,269,347 B1 * | 9/2007 | Matricardi et al. ......... 398/24 |
| 7,415,213 B2 * | 8/2008 | Wang .................... 398/209 |
| 7,463,870 B2 * | 12/2008 | Peusens et al. ........... 455/130 |
| 2001/0028760 A1 * | 10/2001 | Yaffe .................... 385/27 |
| 2002/0163960 A1 * | 11/2002 | Blodgett et al. ........... 375/232 |
| 2003/0091004 A1 * | 5/2003 | Tang .................... 370/252 |
| 2003/0109274 A1 * | 6/2003 | Budka et al. ............. 455/522 |
| 2004/0063453 A1 * | 4/2004 | Koo et al. ............... 455/522 |
| 2004/0184802 A1 * | 9/2004 | Xu ...................... 398/27 |

(Continued)

FOREIGN PATENT DOCUMENTS

WO    WO 02/071670 A2 *    9/2002

*Primary Examiner*—Ken N Vanderpuye
*Assistant Examiner*—Danny W Leung
(74) *Attorney, Agent, or Firm*—Wall + Tong, LLP (57) ABSTRACT

Techniques to control an optical receiver having a control loop using Bit Error Rate (BER). In one implementation, a bit error rate (BER) associated with a received optical signal is determined. Indication of the BER to a control loop adapted is provided to adjust the optical signal in a manner tending to reduce the BER. The received optical signal is adapted in a manner tending to increase the BER such that the control loop operates within an active control region.

19 Claims, 4 Drawing Sheets

U.S. PATENT DOCUMENTS

| | | | |
|---|---|---|---|
| 2004/0218919 A1* | 11/2004 | Hunsche et al. | 398/27 |
| 2005/0058459 A1* | 3/2005 | Chandrasekhar et al. | 398/161 |
| 2005/0226613 A1* | 10/2005 | Raddatz | 398/27 |
| 2006/0008279 A1* | 1/2006 | Chiang et al. | 398/202 |
| 2006/0040698 A1* | 2/2006 | Shiu et al. | 455/522 |
| 2006/0067619 A1* | 3/2006 | Welch et al. | 385/37 |
| 2006/0148509 A1* | 7/2006 | Koo et al. | 455/522 |
| 2006/0274861 A1* | 12/2006 | Langenbach et al. | 375/341 |
| 2007/0053688 A1* | 3/2007 | Benz et al. | 398/27 |
| 2007/0116132 A1* | 5/2007 | Fediakine et al. | 375/242 |
| 2007/0116460 A1* | 5/2007 | Fediakine et al. | 398/38 |
| 2007/0147850 A1* | 6/2007 | Savory et al. | 398/208 |
| 2007/0248357 A1* | 10/2007 | Fediakine et al. | 398/27 |
| 2008/0222493 A1* | 9/2008 | Fediakine et al. | 714/774 |

* cited by examiner

DELIBERATE SIGNAL DEGRADATION FOR OPTIMIZING RECEIVER CONTROL LOOPS

FIELD OF THE INVENTION

The invention is related to the field of optical telecommunications, and in particular, to method for optimizing optical receiver control loops.

BACKGROUND OF THE INVENTION

It is well known that signals transported over an optical network suffer degradation between associated transmitters and receivers. There are many possible causes for the transmitted optical signals to degrade; among them are polarization mode dispersion (PMD), chromatic dispersion (CD), etc. Some of those effects might change the signal characteristic over time, some effects are temperature dependant. No matter what caused the degradation, the more the received signal is distorted, the more errors will be made at detection up to the point where the transmission becomes ineffective.

There are many ways to compensate for errors at the receiver. For example, forward error correction (FEC) is commonly used in optical transmission networks to correct errors of the received signals. In FEC, the transmitted signals include redundant information used for reconstruction of the transmitted sequence (error correction). Another example is an adaptive receiver that allows for the receiver to adjust and/or modify optical and/or electrical components thereby reducing the amount of errors received at the receiver. A combination of the two examples is also possible.

The adaptive receiver functions well in static optical networks where signals travel substantially the same path. Slow changes in the input signal characteristic at the receiver might be compensated by adjustments done by the adaptive receiver. The input signal characteristics can be compensated as long as the time constants of the adaptive receiver are faster than the signal changes. In particular, if some of the adjustments of the adaptive receiver are based upon the number of errors computed from the overhead information, then the time constants of the adaptive receiver are dependant on the signal quality. In that case, some of the adjustments might start to drift from the optimum for high quality input signals. This drift might be caused either by some offset in the control loop and/or by slowly changing characteristics of the input signal to the optical receiver. This will be termed 'the receiver is outside the active control region' henceforth.

However, in an optically switched WDM network where the optical signals are constantly being switched onto different paths, the signal characteristic could change abruptly at the receiver. The latter is not limited to the switched signals but also applies to neighbor channels of the WDM link. The sudden change of signal characteristic will most probably result in drastic increase of errors at the receiver if the adaptive receiver is not at the optimum setting. As a result, the FEC might not be able to compensate for the errors at the receiver. If the settings of the adaptive receiver have drifted from the optimum settings, transmission faults will likely occur.

An object of the present invention is, therefore, to enable the adaptive receiver to find and track the optimum setting thus enhancing the robustness against abrupt signal degradation.

SUMMARY

Various deficiencies of the prior art are addressed by the present invention of methods for an optical receiver having a control loop using Bit Error Rate (BER) as a feedback. In one embodiment, the invention provides for a method of determining a bit error rate (BER) associated with a received optical signal and providing indication of said BER to a control loop adapted to adjust the optical signal in a manner tending to reduce the BER. In accordance with the method, the received optical signal is adapted in a manner tending to increase the BER such that the control loop operates within an active control region.

Another embodiment of the invention provides a method for using an alternate feedback signal for an adaptive optical receiver normally based upon the bit error rate (BER). The feedback signal will be called 'vertical eye opening' and is based upon a combination of evaluating the BER feedback and actively controlling the optical receiver as described in the first embodiment.

In another embodiment of the invention, a data transmission system wherein data transmitted to a receiver via a network is adapted via a transmitter control mechanism in response to a bit error rate (BER) signal provided by the receiver. The system adjusts, at said transmitter and/or receiver, at least one parameter of a received data signal to cause the BER associated with the received data signal to be within a range of BER values. In accordance with the invention, the range of BER values corresponds to an active control region.

The invention further provides other methods and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of an optical receiver in an optical switched network; however, those skilled in the art and informed by the teachings herein will realize that the invention is also applicable to any apparatus and method that use control loops in a communications network.

Figure 1:
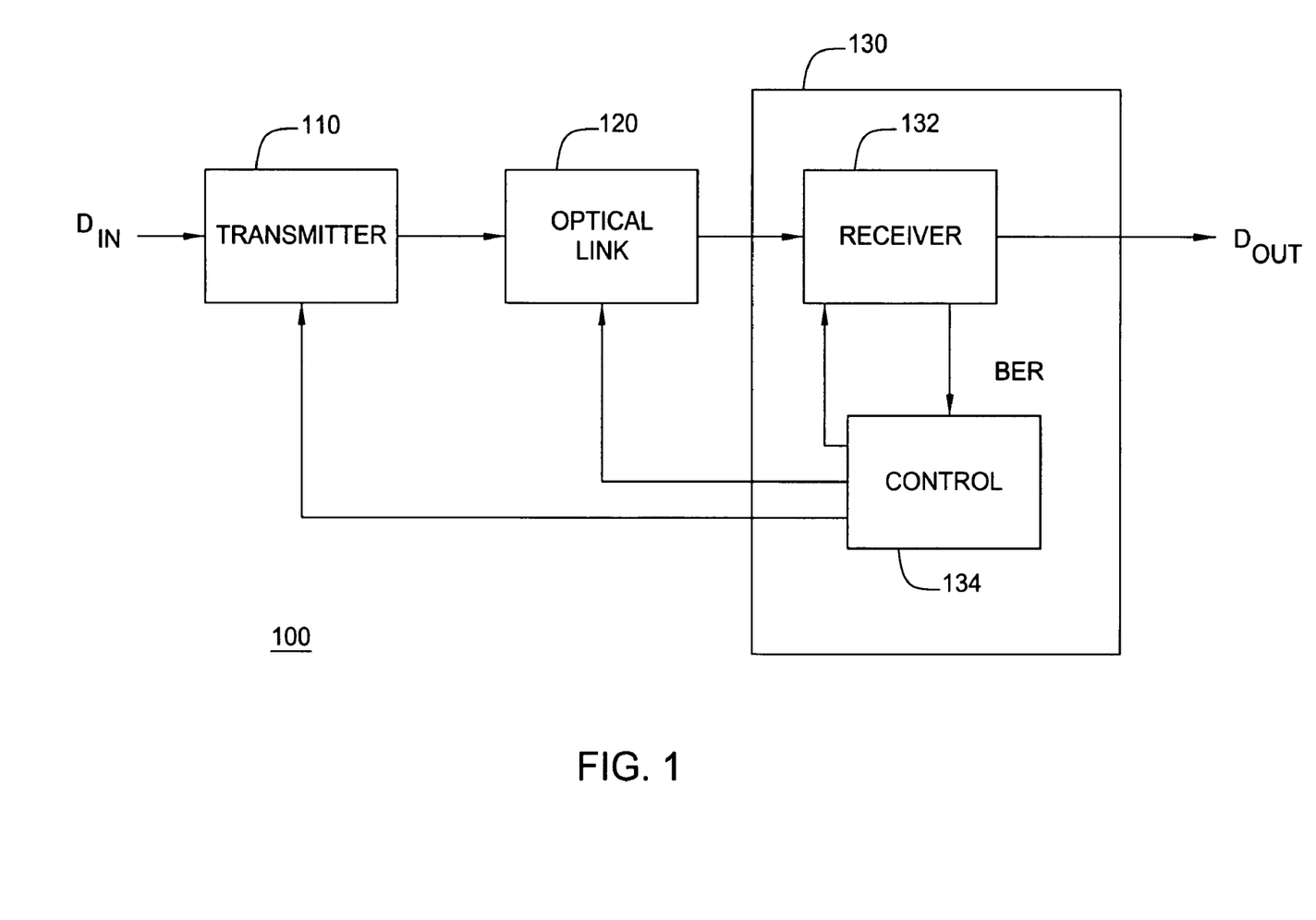
FIG. 1 depicts a block diagram of an optical transmission system.

FIG. 1 depicts a block diagram of an optical transmission system. The optical communications network 100 of FIG. 1 includes a transmitter with forward error correction (FEC) encoding 110, an optical transmission link 120, and a receiver system 130. The receiver system includes a receiver with FEC decoding 132 and a controller 134.

The transmitter 110 may comprise a conventional device, group of devices or any system configured to receive an input data signal $D_{in}$ and provide a corresponding modulated data signal. $D_{in}$ may comprise an electrical input signal or an optical input signal. The output will be an optical signal which could be a wavelength division multiplexed (WDM) signal or other types of optical signals. The transmitter 110 also accepts a feedback control which allows the characteristics of the outputted optical signals, such as the output power, to be selectively varied.

The optical link 120 may include conventional optical fiber or any part of an optical fiber network that transports optical signals. An example of the link could include optical fibers or the like. The optical link 120 could comprise optical components such as optical amplifiers (OA) or polarization mode dispersion (PMD) compensators (not shown). The optical link 120 is the conduit for the optical signals traveling from the transmitter 110 to the receiver 130. This link also may accept feedback control signals from the receiver 130 which allows for the modification and adjustment of the characteristics of the optical signals being transmitted such as e.g. output power of the OA.

The receiver system 130 includes a receiver with FEC 132 and a controller 134. The receiver with FEC 132 may include any device, group of devices or system configured to receive and correct the errors of the received optical signals. Error correction will be performed on the received signal and the receiver 132 will output the inputted signals as electrical signals $D_{out}$. The receiver 132 will monitor the number of received errors. The ratio of the number of error bits to total number of bits received is known as the bit error rate (BER). The BER is transmitted from the receiver 132 to the controller 134. The BER is used by the controller 134 to determine if adjustments need to be made to certain components of the optical network. Depending on the received BER, the controller 134 will transmit a feedback signal to the transmitter 110, the link 120, or the receiver system 130 in order to increase the system margin against degradation in the received optical input signal.

Figure 2:
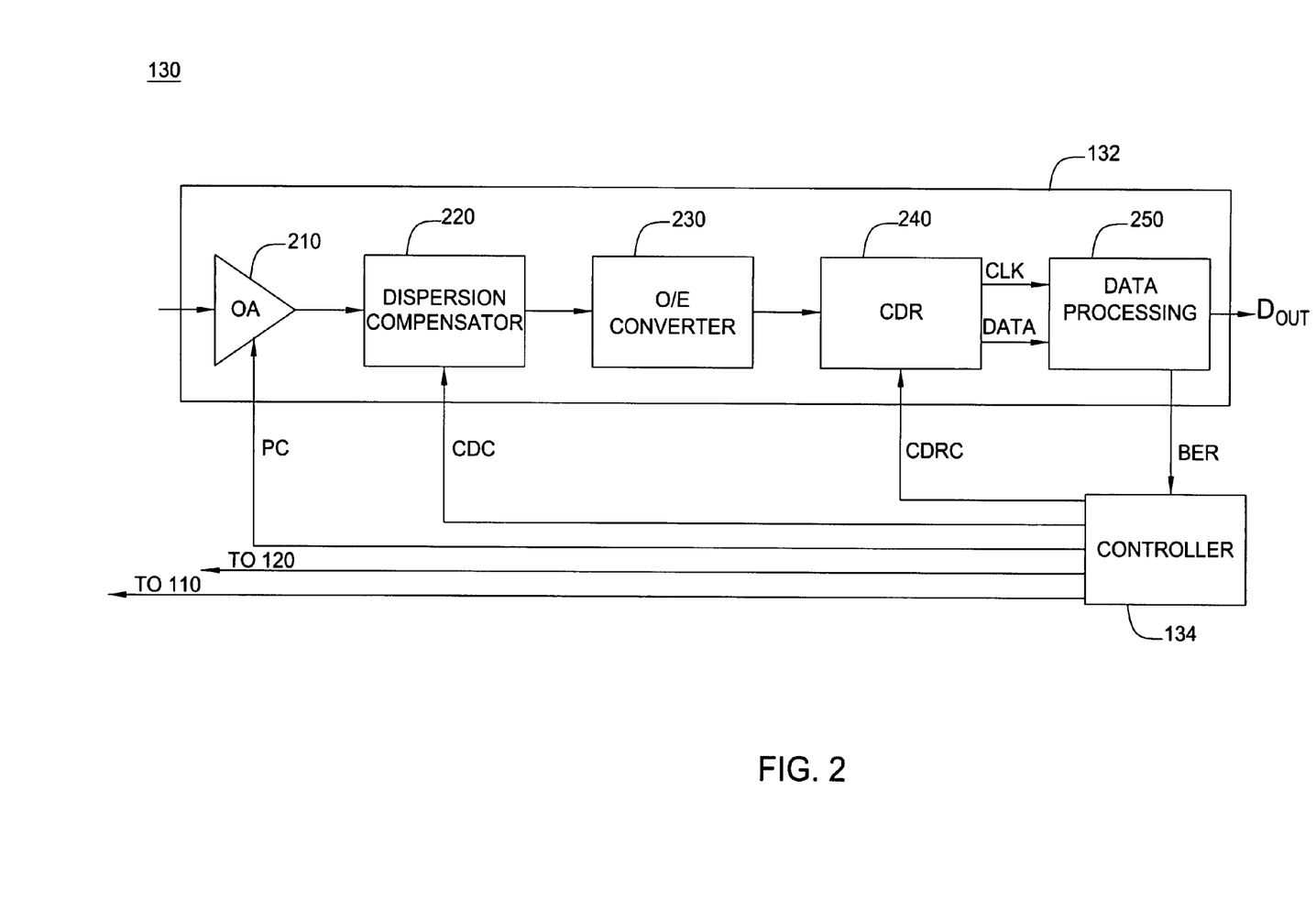
FIG. 2 depicts a block diagram of an optical receiver system according to an embodiment of the invention.

FIG. 2 depicts a block diagram of an optical receiver system 130 according to an embodiment of the invention. The optical receiver system 130 may include the following components: an optical amplifier 210, a tunable dispersion compensator 220, an optical to electrical (O/E) converter 230, a clock and data recovery (CDR) circuit 240, a data processing circuit 250 and a controller 134.

The optical receiver system 130 accepts as input the received optical signal which is received by the optical amplifier (OA) 210 which could be an erbium-doped fiber amplifier (EDFA). The OA might be able to adjust the signal power delivered to the dispersion compensator by using a variable optical attenuator (VOA) located in the OA. The VOA may be configured to respond to the feedback power control (PC) signal.

The tunable dispersion compensator 220 is a standard component for compensating for the chromatic dispersion of the input optical signal. Compensator 220 receives an amplified optical signal from the output of the OA. The compensator 220 adjusts the received optical signal to compensate for chromatic dispersion (CD). A chromatic dispersion control (CDC) is used as feedback control for compensating the signal for CD by the tunable dispersion compensator 220. The compensated optical signal is then outputted from the compensator 220.

The optical signal then passes to the O/E converter 230. The O/E converter could be a photodiode or integrated photo receiver. This component receives the optical signal from the tunable dispersion compensator 220 and outputs the electrical equivalent of the received optical signal.

The CDR 240 receives the outputted electrical signal from the O/E converter 230 and outputs the clock signal and the data signal. CDR uses decision threshold and sampling phase information in order to derive the clock and data signals from the received signal. CDR could consist of one or more components. Clock and data recovery control (CDRC) may be received by the CDR as feedback control signal. CDRC could be used to influence the decision threshold and/or sampling phase of the received signal.

The data processing circuit 250 uses the clock and data signals and performs, among other functions, FEC decoding on the received signal to obtain the originally transmitted signal. It also informs the controller 134 of the BER at the optical receiver 132. Determining BER is well known in the art. For example, some possible methods, alternative to using the information from the FEC overhead, include analyzing the eye diagram, Q-factor or the like.

The feedback control signals mentioned above are generated by the controller 134 and transmitted back to the different components and devices of the system. The system may have some or all of the control loops shown in FIG. 2. The system might also have additional control loops based on the BER feedback not shown in FIG. 2. The receiver system 200 may have a clock and data recovery control (CDRC) loop that allows the controller 134 to adjust the decision threshold in the CDR 240 by using the information transmitted in a CDRC feedback signal to the CDR 240. The controller 134 could also adjust the sampling phase of the received signal at the CDR 134 by transmitting another type of control information in the CDRC. Another possible control loop is the chromatic dispersion control (CDC) loop which allows the controller 134 to tune the dispersion compensator to adjust the receiver to compensate for CD of the optical channel. There could also be a control loop for adjusting the output power of the optical amplifier by transmitting a PC to the optical amplifier. That OA could be located either in the receiver or elsewhere in the optical transmission system. The controller 134 might also form a feedback control loops to the transmitter 110 and/or the transmission link 120 of FIG. 1. For example, the controller might send a feedback signal to adjust the PMD compensator which might be located in the transmitter 110 or in other parts of the optical link 120. The controller 134 could also send a feedback signal to the transmitter 110 to adjust the output power of that transmitter 110 or other parameters that influence the characteristics of the optical signal, e.g. MZM bias or duty cycle.

In one embodiment, the BER is used to optimize the components of an optical network by advising the controller to adjust for different parameters of the optical signals. The control loops using the BER information can optimize the parameters of the optical switched network. The controller 134 will receive a BER from the data processing circuit 250 which will allow the controller to know the quality of the received signal. Depending on the value of BER, the controller can selectively send feedback control information to certain components in the system. The control information can vary the parameters of the components and decrease BER that has been received at the receiver 130.

There are some parameters of the fiber link that can change over time. E.g. the amount of chromatic dispersion for the received optical signal is affected by the temperature of the transmission fiber and thus changes with temperature. If the BER of the transmission network is low, the receiver will not notice the dispersion of the fiber has changed as the receiver will not receive any bit errors. As a result, that control loop could be off the optimum. Thus, receiver will not receive an optimum signal.

In an optical switching network, signal quality may degrade very fast. This is due to the physical nature of the optical network. For example, when a wavelength is added to a WDM signal, all other wavelengths in the signal will be affected. Depending on the system design target, adding an additional wavelength can take between 1 millisecond and 1 second.

Keeping track and maintaining the input signal at optimum even when the BER at the moment is low is important to the present invention. In the case of the switched network, there could be sudden degradation of input signal. The receiver could have very good BER at one moment, then receiving an enormous amount of errors less than one second later. It is practically impossible to keep track of all the settings of all the receiver control loops in such a short time. The FEC might have problems correcting all the errors, and the control loop might not be able to adjust to all the error at the speed required. Due the physical nature of certain control loop, it might take up to 100 seconds for optimization to be obtained again at the receiver. Therefore, it is necessary to keep track of the optimum settings even if you have very good BER at the moment. As an example, at a BER of 1e-15 and a bit rate of 10 GBit/s, only approximately one error will happen every day. This is not sufficient to keep track of the optimum settings of all control loops. By intentionally degrading the optical input signal, the BER can be set to an arbitrary level above the current value, thereby enabling the controller 134 to keep track of the optimum settings.

Figure 3:
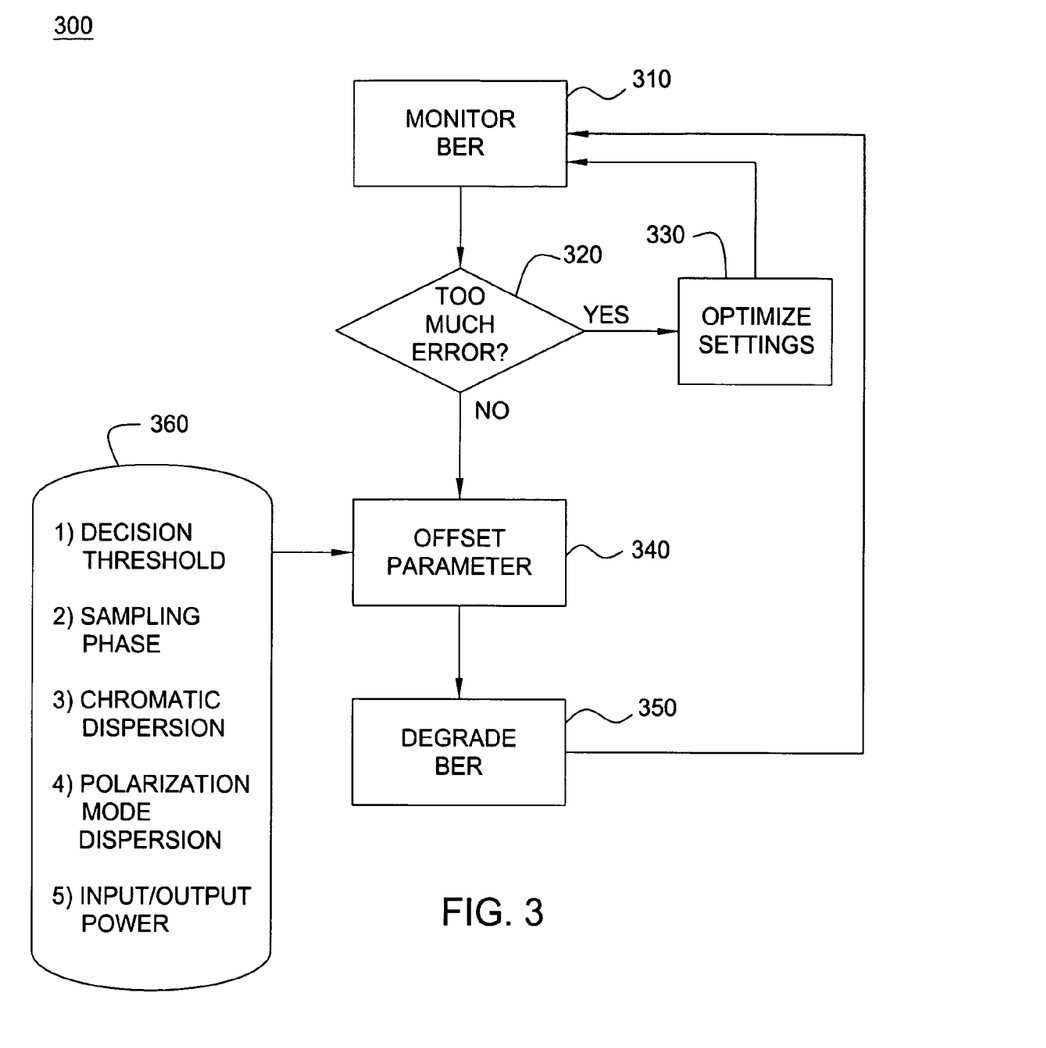
FIG. 3 depicts a flow diagram of a method according to an embodiment of the invention.

FIG. 3 depicts a flow diagram of a method according to an embodiment of the invention. As shown in FIG. 3, parameters of the components of the system are adjusted to keep the control loops of the optical communications system in an active mode of operation. The data processing circuit 250 will monitor and report the BER of the received signal at the receiver 310. If the received signal contains too many errors 320, then the controller 134 will send the required feedback signal to the transmitter 110, transmission link 120, or the receiver itself in order for the receiver to continue to optimize the settings thereby improving the signal quality and reducing the number of received errors. If the received signal contains not enough errors in a certain interval (i.e. the BER is below the acceptable range), then the controller will offset one parameter of a control loop 340 to degrade the BER 350. Some parameters that could be offset include the decision threshold, sampling phase, chromatic dispersion, polarization dispersion, and input/output power 360. The parameter will be selected such that the BER will increase at the receiver. As a result, this action of degrading the BER will force the control loops to check the network 310 and ensure all components of the optical communications system is still operating at optimum 330.

For example, one way to detect slow changes is to cause degradation using the CDRC. The controller can send a feedback signal modifying the decision threshold values at the CDR 240. By changing the decision threshold to allow for more errors, the BER of the received signals will get worse. Now the amount of degradation needed to obtain a pre-set BER can be used for optimizing all other control loops (instead of using the BER itself). The controller 134 will perform its standard routine to ensure all the feedback control loop are optimized and allow for the optimal input signal to be received by the receiver. Through this process, acceptable minor drifts and other degradation will be compensated and/or corrected in a timely manner.

In an embodiment, a decision threshold is changed to induce an acceptable high BER for optimizing the other control loops. It is also possible that any other one or more of the control loops can also be used by the controller 134 to degrade the BER in order to obtain information on the optimum settings of the control loops. However, decision threshold control loop is a good loop to vary because the decision threshold can be changed very fast with respect to the system. Even after the decision threshold is shifted away from the optimal setting, the decision threshold can be quickly adjusted back to the previous optimal setting, and the input signal will still be received at substantially the optimal setting. Because of the physical nature of the system, the controller can vary the decision threshold quickly so the receiver will continue receiving input signal with minimal errors after the check.

Unlike the decision threshold control loop, a chromatic dispersion control loop may be a very slow control loop depending on the physical implementation. If that loop has drifted, then it might take up to 100 seconds to obtain the optimizing setting for the control loop. In a switched optical network, large amounts of errors could occur within the second right after switching. The FEC might not be able to correct all the errors received. The receiver will not know the new optimal chromatic dispersion setting. The FEC will fail and the transmission will be useless. The receiver does not have the luxury of up to 100 seconds to regain the optimizing settings for this control loop. The present invention will keep the chromatic dispersion control loop in an active state thereby preemptively tuning the parameters for chromatic dispersion.

Another embodiment involves obtaining the settings for an optimized input signal by degrading the input signal to get bit error without influencing the other control loops. For example, by changing the decision threshold some other control loops might be influenced. The receiver might compensate for shift in decision threshold by introducing some dispersion. This compensation by the receiver will cause the controller 134 to transmit improper feedback control signals causes the control loops to drift away from optimal. Therefore, it is important to find ways to degrade input signal without influencing the other control loops. One way to achieve this objective is to move the decision threshold very fast from the upper rail to the lower rail and back. This adjustment can be done very fast relative to the system. The effect of the fast shifting decision threshold will average out over time, and the other control loops will not notice the variation of the decision threshold.

Figure 4:
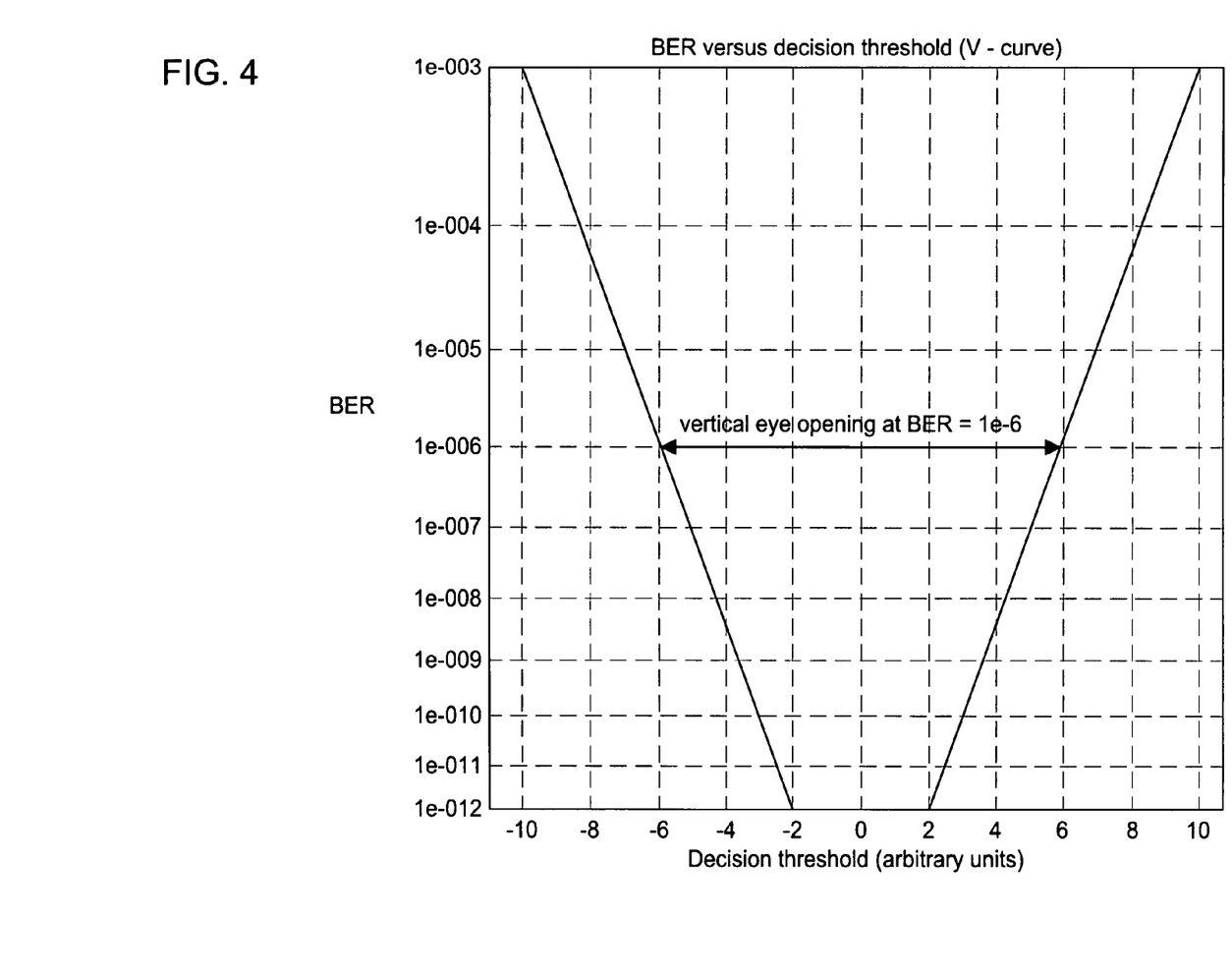
FIG. 4 depicts a graphical representation useful in understanding the present invention.

FIG. 4 depicts a graphical representation useful in understanding the present invention. The graph shows a V-curve. The decision threshold is shown on the horizontal axis. It is an arbitrary value where zero is the optimal setting. On the negative side and positive side represent the degraded BER. On the vertical axis is the recorded BER. This graph represents the BER for a certain setting of the decision threshold, and at the same time, it shows a vertical eye opening. The vertical eye opening information, instead of the BER can be fed back to the other components of the system as feedback parameter to control the feedback control loops.

FIG. 4 defines the margin of the system and quality of the input signal. The left half of the "V" represents the lower threshold which is a line from −2 arbitrary units at $10^{-12}$ BER to −10 arbitrary units at $10^{-3}$ BER. The right half of the "V" is the line representing the upper threshold which is the line from 2 arbitrary units at $10^{-12}$ BER to 10 arbitrary units at $10^{-3}$ BER. The difference between the upper threshold and lower threshold is known as "vertical eye opening." This parameter can be taken as the amount of dithering the threshold for signal degradation. One advantage of dithering the threshold is that the vertical eye opening linearly represents the system margin generally given in the unit decibel [dB].

When dithering the decision threshold from the upper rail to the lower rail and back, it is important to move the decision threshold in a way with certain fixed bit error rate. For example, if the upper rail is at decision threshold 6, then the lower rail should be shifted to a decision threshold of −6. The decision threshold can be shifted between +6 and −6 arbitrary units, and the BER is $10^{-6}$. Once the input signal is intentionally degraded to a fix BER, then the BER should not be used to optimize other control loop. The vertical eye opening as a measure of the intentionally introduced degradation should be used as a feedback signal for the other control loops in this case.

In a different embodiment, the WDM signal received by the receiver may be degraded by loading the signal with optical noise. For example, EDFA could be used to introducing noise in the optical domain. Electrical noise could also be included to degrade the input signal. For example, this degradation could be accomplished by using an optical attenuator between the photodetector and the optical amplifier. The BER may also be degraded by setting one or more control loops on the receive side such as the already describe decision threshold. Also, degradation may be accomplished by adjusting to different sampling phase, offsets, chromatic dispersion, polarization mode dispersion, or other means to influence the optical signal on the receiver side. It is also envisioned that it might be advantageous to adjust a combination of the above parameters.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method adapted for use at a receiver, the method comprising:
   determining a bit error rate (BER) associated with a received optical signal;
   providing an indication of said BER to a control loop, wherein the control loop is adapted to adjust the optical signal in a manner tending to reduce the BER; and
   adapting the received optical signal in a manner tending to increase the BER such that the control loop operates within an active control region, wherein adapting the received optical signal in a manner tending to increase the BER comprises adjusting at least one control parameter at the receiver, wherein the at least one control parameter comprises at least one of:
   a decision threshold; and
   at least one feedback control for adapting at least one of sampling phase, chromatic dispersion, and polarization mode dispersion.

2. The method of claim 1, wherein the decision threshold is a data recovery decision threshold.

3. The method of claim 1, wherein the decision threshold is determined using dithering.

4. The method of claim 1, wherein the decision threshold is adjusted by shifting the decision threshold from a positive number of arbitrary units to a negative number of arbitrary units and back to the positive number of arbitrary units.

5. The method of claim 1, wherein the at least one control parameter comprises feedback control for adapting at least one of input power and output power.

6. The method of claim 1, wherein adapting the received optical signal in a manner tending to increase the BER comprises at least one of loading the signal with optical noise and loading the signal with electrical noise.

7. The method of claim 1, wherein the adapting step further includes transmission of a vertical eye opening value as a feedback control signal.

8. The method of claim 7, wherein the vertical eye opening and the BER are determined using a common processing element.

9. A method adapted for use in an optical receiver normally providing an indication of a bit error rate (BER) associated with a received optical signal, the BER indication adapted for use by a control loop, the control loop having associated with it an active control region, the method comprising:
   adapting, at the optical receiver, at least one parameter of the received optical signal to increase the BER such that the control loop operates within the active control region, wherein the at least one parameter comprises at least one of:
   a decision threshold; and
   at least one feedback control for adapting at least one of sampling phase, chromatic dispersion, and polarization mode dispersion.

10. The method of claim 9, wherein the decision threshold is a data recovery decision threshold.

11. The method of claim 9, wherein the decision threshold is determined using dithering.

12. The method of claim 9, wherein the at least one parameter comprises feedback control for adapting at least one of input power and output power.

13. The method of claim 9, wherein the adapting step further includes transmission of a vertical eye opening value as a feedback control signal.

14. In an optical data transmission system wherein data transmitted to an optical receiver via an optical network is adapted via a control mechanism with at least one control loop in response to a bit error rate (BER) signal provided by the optical receiver, a method comprising:
   adjusting, at said receiver, at least one parameter of a received data signal to cause the BER associated with the received data signal to be degraded such that the at least one control loop operates within an active control region, wherein the at least one parameter comprises a decision threshold.

15. The method of claim 14, wherein the decision threshold is a data recovery decision threshold.

16. The method of claim 14, wherein the decision threshold is determined using dithering.

17. The method of claim 14, wherein the decision threshold is adjusted by shifting the decision threshold from a positive number of arbitrary units to a negative number of arbitrary units and back to the positive value of arbitrary units.

18. The method of claim 14, wherein the at least one control parameter comprises feedback control for adjusting at least one of sampling phase, chromatic dispersion, polarization mode dispersion, input power, and output power.

19. The method of claim 14, further comprising transmitting a vertical eye opening value as a feedback control signal.

* * * * *

UNITED STATES PATENT AND TRADEMARK OFFICE
CERTIFICATE OF CORRECTION

PATENT NO. : 7,609,981 B2  Page 1 of 1
APPLICATION NO. : 11/221068
DATED : October 27, 2009
INVENTOR(S) : Benz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Twelfth Day of October, 2010

David J. Kappos
*Director of the United States Patent and Trademark Office*